(12) United States Patent
Fan

(10) Patent No.: US 10,253,926 B1
(45) Date of Patent: Apr. 9, 2019

(54) CLAMPING BASE FOR HOLDER

(71) Applicant: Eagle Fan, Hsinchu (TW)

(72) Inventor: Eagle Fan, Hsinchu (TW)

( * ) Notice: Subject to any disclaimer, the term of this patent is extended or adjusted under 35 U.S.C. 154(b) by 0 days.

(21) Appl. No.: 15/884,417

(22) Filed: Jan. 31, 2018

(51) Int. Cl.
| | | |
|---|---|---|
| *F16M 13/02* | (2006.01) | |
| *F16M 11/04* | (2006.01) | |
| *F16B 2/12* | (2006.01) | |
| *F16B 2/18* | (2006.01) | |
| *F21V 21/088* | (2006.01) | |

(52) U.S. Cl.
CPC ............. *F16M 13/022* (2013.01); *F16B 2/12* (2013.01); *F16M 11/041* (2013.01); *F16B 2/185* (2013.01); *F21V 21/088* (2013.01)

(58) Field of Classification Search
CPC ... F16B 2/12; F16B 2/18; F16B 2/185; F16M 13/02; F16M 13/022; A43C 11/1433; A43C 11/1413; A43C 11/1406; A43C 11/142
USPC .............. 248/228.3, 229.12, 229.15, 231.41, 248/231.71; 24/170, 591.1; 269/228
See application file for complete search history.

(56) References Cited

U.S. PATENT DOCUMENTS

| | | | | |
|---|---|---|---|---|
| 450,817 A | * | 4/1891 | Peevers ..................... | A47H 1/13 248/254 |
| 550,443 A | * | 11/1895 | Deal ..................... | A47B 23/046 108/146 |
| 1,039,337 A | * | 9/1912 | Banderbeek ............. | B23Q 3/02 269/156 |
| 1,227,738 A | * | 5/1917 | Bellis et al. .............. | B67B 7/18 248/229.15 |
| 1,349,225 A | * | 8/1920 | Rosenblum ............ | A41H 15/00 24/527 |
| 1,394,529 A | * | 10/1921 | Armitage ................... | F16B 2/12 248/231.41 |
| 1,760,346 A | * | 5/1930 | Correa .................. | A47C 21/022 24/527 |
| 2,323,654 A | * | 7/1943 | Gordy ..................... | B25B 5/067 269/214 |
| 2,529,686 A | * | 11/1950 | Green ...................... | B60D 1/56 224/519 |
| 2,530,478 A | * | 11/1950 | Parent ................... | A61J 9/0638 248/103 |

(Continued)

FOREIGN PATENT DOCUMENTS

| | | | | |
|---|---|---|---|---|
| EP | | 663155 A1 * | 7/1995 | ............. A43C 11/14 |

*Primary Examiner* — Jonathan Liu
*Assistant Examiner* — Taylor L Morris
(74) *Attorney, Agent, or Firm* — Lin & Associates Intellectual Property, Inc.

(57) ABSTRACT

A clamping base for holder is provided, comprising: a base, a clamping element, and a counteracting element. The base comprises a sliding track within, for installing and allowing the clamping element to slide linearly; an opening and a guiding groove disposed oppositely and parallel to slide direction; and a plurality of hook blocks at intervals disposed on outside wall of the guiding groove. The counteracting element is fixed inside the base. Assembly of the base and counteracting element forms an L-shaped profile. The clamping element extends a sliding strip, installed inside the slide track so that the clamping element moves towards or away from counteracting element. To lock a position after moving the clamping element, a fastening block is fixed to the sliding strip through the guiding groove. A wrench element is coupled to the fastening block and a buckle ring. The buckle ring can engage the hook blocks.

9 Claims, 9 Drawing Sheets

(56) References Cited

U.S. PATENT DOCUMENTS

| Patent/Pub No. | Date | Name | Classification |
|---|---|---|---|
| 2,548,248 A * | 4/1951 | Wiebe | B21C 47/24 24/326 |
| 2,804,095 A * | 8/1957 | Schauenburg | E21F 1/04 138/107 |
| 3,071,368 A * | 1/1963 | Harding | B25B 5/04 269/215 |
| 3,544,049 A * | 12/1970 | Ribble | F16L 3/23 248/231.41 |
| 3,666,260 A * | 5/1972 | Myers | B25B 1/06 269/202 |
| 3,933,346 A * | 1/1976 | Carver | B25B 7/16 269/4 |
| 4,098,479 A * | 7/1978 | Hartstone | F16B 2/12 248/214 |
| 4,336,962 A * | 6/1982 | Read | B66C 1/442 294/106 |
| 4,395,801 A * | 8/1983 | Gabrielli | A43C 11/1413 24/70 SK |
| 4,627,604 A * | 12/1986 | Choi | B25B 1/125 269/214 |
| 4,681,290 A * | 7/1987 | Crosbie | E04G 21/1841 248/226.11 |
| 5,090,095 A * | 2/1992 | Lightfoot | A47H 1/18 160/330 |
| 5,092,426 A * | 3/1992 | Rhodes | A62B 35/0068 182/3 |
| 5,544,393 A * | 8/1996 | Lightfoot | A47H 13/04 160/330 |
| 5,584,457 A * | 12/1996 | Fawcett | B25B 1/12 248/229.1 |
| 6,156,026 A * | 12/2000 | Rondeau | E04H 4/12 239/283 |
| 6,962,234 B1 * | 11/2005 | Reeves | E04G 21/3261 182/36 |
| 7,866,617 B2 * | 1/2011 | Kleitsch | A61M 5/1417 248/228.5 |
| 7,997,633 B2 * | 8/2011 | Bahler | B65G 7/12 269/228 |
| 8,714,370 B2 * | 5/2014 | Jebara | A45F 5/06 211/34 |
| 8,827,037 B2 * | 9/2014 | Chilton | E04G 5/14 182/112 |
| 8,925,969 B2 * | 1/2015 | Sonnier | F16L 23/003 285/252 |
| 9,481,286 B1 * | 11/2016 | Xiao | B60P 7/15 |
| 2006/0076785 A1 * | 4/2006 | Eriksson | E05C 19/14 292/247 |
| 2006/0108498 A1 * | 5/2006 | Jackson | G09F 7/18 248/690 |
| 2012/0084949 A1 * | 4/2012 | Al-Basri | A47G 21/167 24/457 |
| 2012/0280101 A1 * | 11/2012 | Bouverie | F16B 2/12 248/316.4 |
| 2013/0074294 A1 * | 3/2013 | Lynch | A47G 21/167 24/535 |
| 2014/0014797 A1 * | 1/2014 | McSherry | F16B 2/12 248/231.41 |
| 2014/0021420 A1 * | 1/2014 | Beelen | F16B 2/12 254/30 |
| 2016/0095422 A1 * | 4/2016 | Ralph | A45F 5/021 29/426.2 |
| 2016/0230921 A1 * | 8/2016 | Fan | F16M 11/105 |
| 2018/0045337 A1 * | 2/2018 | Gallion | F16M 11/105 |
| 2018/0110352 A1 * | 4/2018 | Chadwick | F16B 2/12 248/316.4 |

* cited by examiner

CLAMPING BASE FOR HOLDER

TECHNICAL FIELD

The technical field generally relates to a base for holder, and in particular, to a clamping base able to clamp onto various board objects so as to provide anchor for connecting support arm to hold portable electronic device.

BACKGROUND

In recent years, with the continuous improvement of technology, many electronic products continue to introduce new features, improving the quality of life. The thin and small electronic products also change the ways people use these products. For example, a tablet or slim screen can be placed on a table top with a set of support bases with support arms, and the viewing position can be freely adjusted. For more stability, through a set of clamping structure fixed to the table or plate work platform, the original support arm can be used to connect and adjust the viewing angle and position.

If a user uses a clamping structure, the mounting and dismounting of the product is often time-consuming and troublesome. The conventional clamping structure usually has a C-shaped cross-section and is driven by rotating a bolt to move a clamping piece to achieve the purpose of holding a fixed device. However, loosening or tightening the bolt is often time-consuming and the exposed screw can easily scratch the people or objects nearby. Therefore, improvement to the designing and the structure is imperative.

SUMMARY

The primary object of the present invention is to provide a clamping base structure for holder, able to clamp or release quickly, without exposed protruding parts, and easy and safe to use.

Another object of the present invention is to provide a clamping base for holder, applicable to a wide range of occasions, such as, table, platform, cupboard door, as well as applicable to a plurality of holders for different products, such as, tablet PC, cell phone, screen and lamp.

To achieve the aforementioned object, the present invention provides a clamping base for holder, comprising: a base, a clamping element, and a counteracting element. The base comprises a sliding track within, for installing the clamping element and allowing the clamping element to slide linearly; an opening and a guiding groove disposed oppositely and parallel to the slide direction; and a plurality of hook blocks at intervals disposed on outside wall of the guiding groove. The counteracting element is fixed inside the base. The assembly of the base and the counteracting element forms an L-shaped profile. The clamping element extends a sliding strip, installed inside the slide track so that the clamping element can move towards or away from the counteracting element. To lock a position after moving the clamping element, a fastening block is fixed to the sliding strip through the guiding groove. A wrench element is coupled to the fastening block, and also coupled to a buckle ring. The buckle ring can engage any one of the hook blocks.

In the present embodiment, the clamping element is a metal plate having a bent shape so that the clamping element has a flexibility and deformation for being slightly bended to enhance clamping tightness. The sliding strip extended from the clamping element is installed inside the slide track perpendicularly.

Moreover, a portion of the plurality of hook blocks is divided into two rows, distributed on two sides of the guiding groove so that two hook blocks are disposed at the same height. The buckle ring is coupled to the wrench, with an exposed segment having a square shape. When fastened, the buckle ring is engaged to one hook block or two hook blocks at the same height, encircling one or more hook blocks, so as to fasten the position of the clamping element. To release, the wrench element is flipped downwards to disengage the buckle ring from the hook blocks to release from the locked position.

The clamping element and the counteracting element are both sheathed inside a soft protective sleeve to avoid scratching the surface of the board when clamping.

Moreover, the counteracting element can be an L-shaped metal plate, and fixed inside the base, thus the assembly still remains an L-shape. However, the counteracting element reserves a connection segment exposed vertically. The thickness of the connection segment is less than the base. As such, the present invention can also be used in cupboard door with smaller gap space.

The base further comprises a connection unit, for providing a support arm to hold a device.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
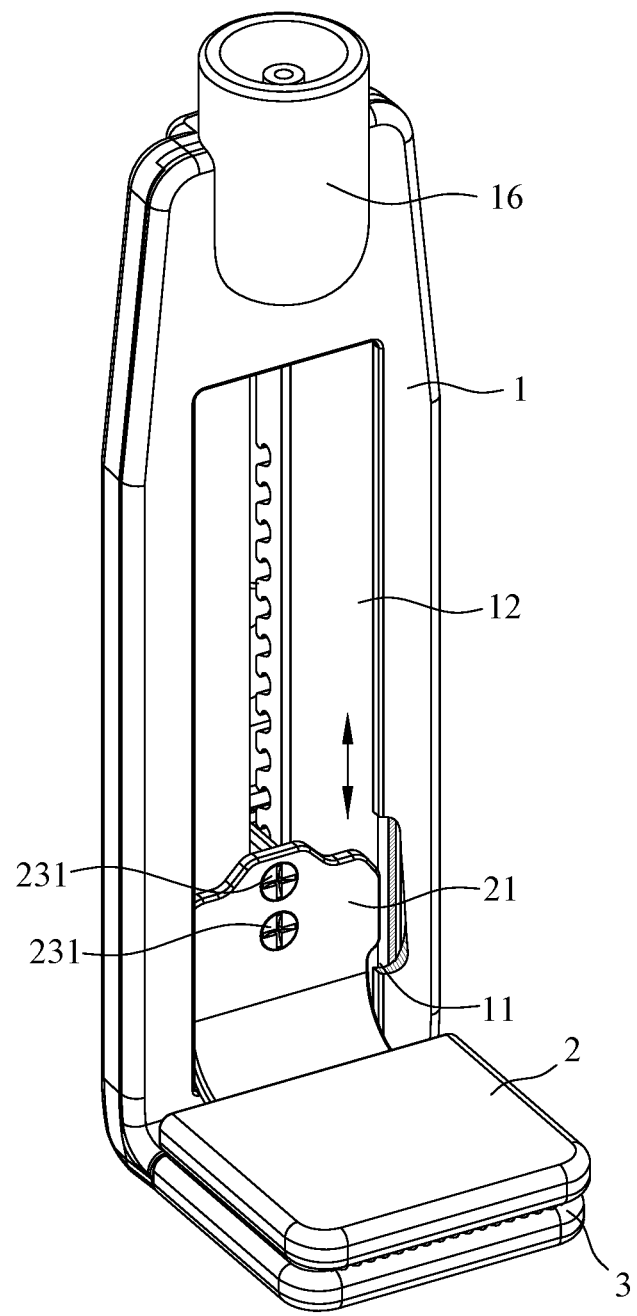
FIG. 1 shows a schematic view of the first embodiment of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a schematic view of the first embodiment of the present invention. The clamping base comprises a base 1, a clamping element 2, and a counteracting element 3. The counteracting element 3 is fixed to the base 1 and the assembly of the two has an L-shaped profile. The clamping element 2 partially extends into the base 1, and can slide linearly upwardly and downwardly. The clamping element 2 and the counteracting element 3 are both located on the same side of the base 1. The clamping element 2 and the counteracting element 3 are responsible for clamping the board-shaped object to be clamped, such as a table, platform, cupboard door panels, and so on. In addition, the back of the base 1 has a locking structure for quickly locking or releasing the position of the clamping element 2 after clamping onto the board.

Figure 2:
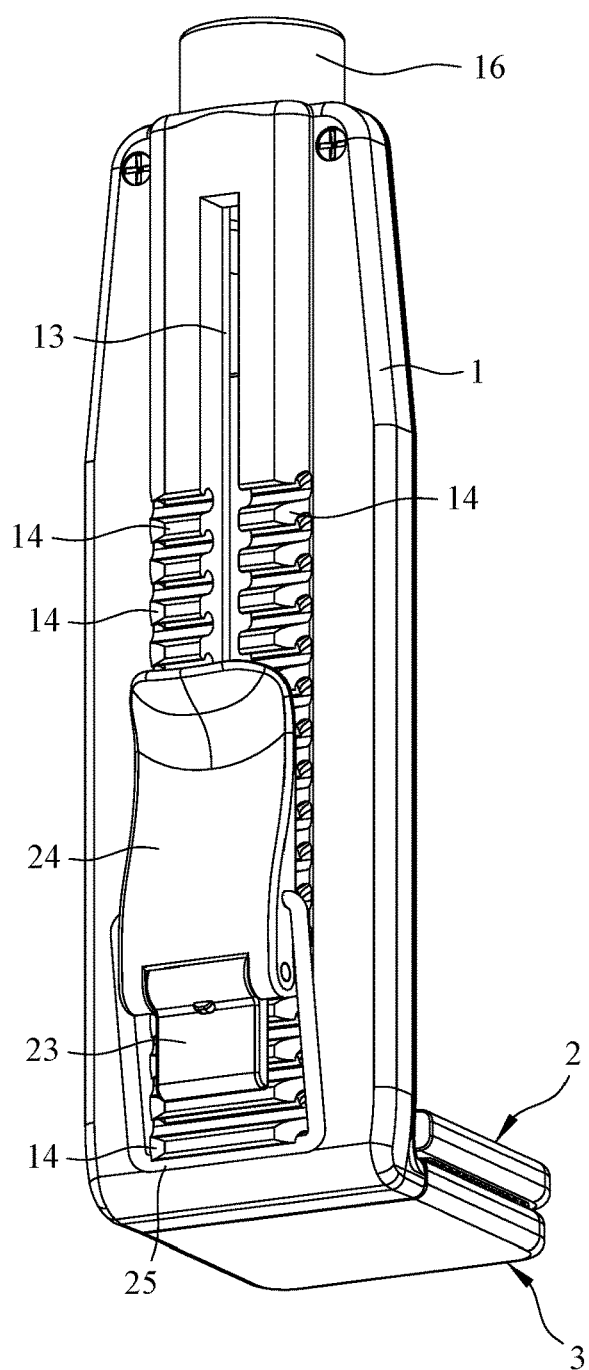
FIG. 2 shows another schematic view of the first embodiment of the present invention.
Figure 3:
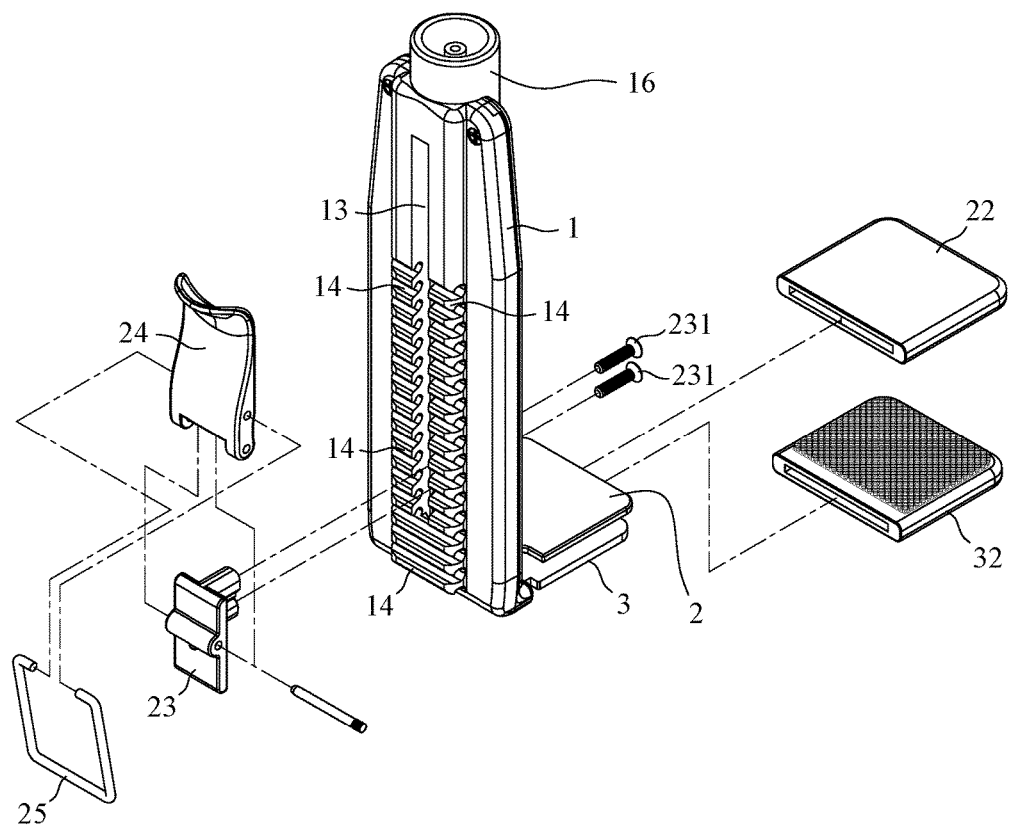
FIG. 3 shows an exploded view of the first embodiment of the present invention.

The base 1 is a hollow long shell, the inside is disposed with a slide track 11 bilaterally symmetrical, the slide track 11 is provided for mounting a sliding strip 21 extended from the clamping element 2 thereon, so that the clamping element 2 can slide along the slide track 11 linearly. As shown in FIG. 1, FIG. 2 and FIG. 3, the base 1 has an opening 12 and a guiding groove 13 respectively on two opposite sides parallel to the sliding track 11. The length and width of the opening 12 are matched with the clamping element 2 to ensure that the clamping element 2 has a movable range capable of moving up and down. The base 1 further comprises a plurality of hook blocks 14 arranged at equal intervals on the outer wall where the guiding groove 13 is located. In the present embodiment, some of the hooks 14 are divided into two rows and distributed on both sides of the guiding groove 13, so two hook blocks 14 are provided at the same height. This part of the structure is for fastening the position of the clamping element 2.

The counteracting element 3 is plate-shaped and fixed to the base 1, so that the assembly of two forms an L-shaped body. The counteracting element 3 and the clamping member 2 are both located on the same side of the base 1. In the present embodiment, the counteracting element 3 is a metal plate. As shown in FIG. 3, the clamping element 2 and the counteracting element 3 are both sheathed inside a soft protective sleeve 22, 32 to avoid scratching the surface of the board during clamping. In addition, the protective sleeve 22, 32 may also be disposed on only the facing surfaces of the clamping element 2 and the counteracting element 3.

Figure 4:
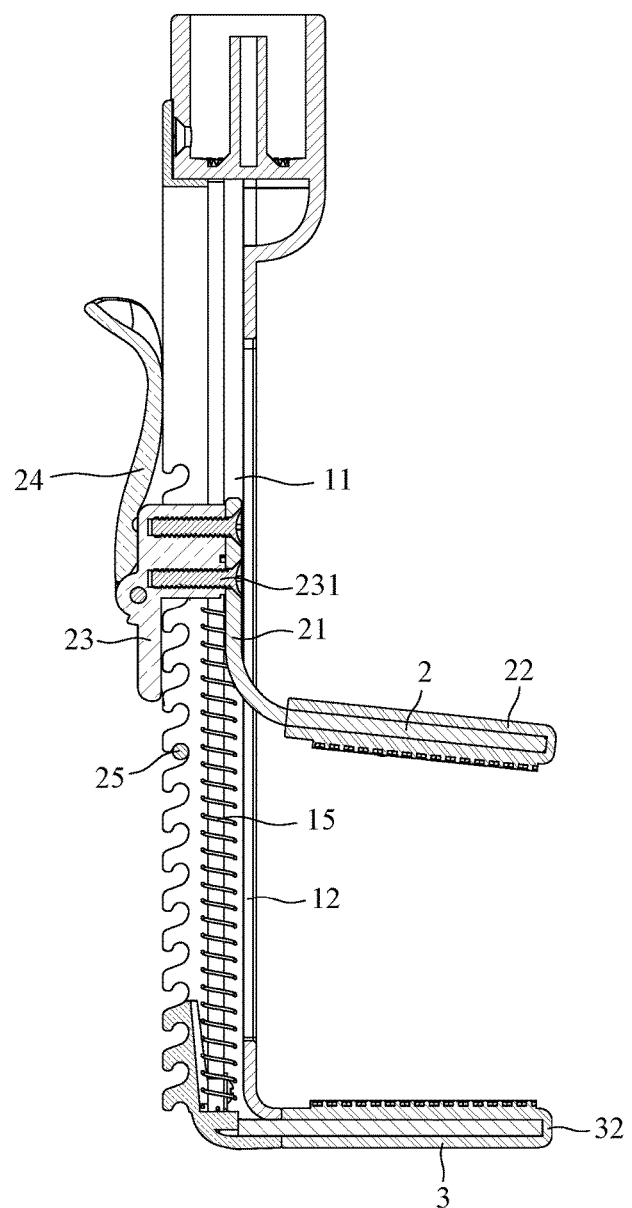
FIG. 4 shows a cross-sectional view of the first embodiment of the present invention after the clamping element is moved upwards.

As shown in FIG. 4, the clamping element 2 is a metal sheet with a bent shape. When an external force is not applied, the clamping element 2 is inclined in shape and has a flexibility that can be bent slightly upward. The purpose is to allow the clamping element 2 to be slightly deformed upwardly when clamping. The sliding strip 21 is perpendicular and limited to slide up and down within the sliding track 11, so as to allow the clamping element 2 to move towards or away from the counteracting element 3, and acting as the moving part for clamping.

The locking structure provided on the back of the base 1 is responsible for quickly fastening the position of the clamping element 2 after moving, as shown in FIG. 2, FIG. 3 and FIG. 4. The clamping element 2 is further provided with a fastening block 23. The fastening block 23 is externally fastened to the sliding strip 21 via the guiding groove 13 and extending into the base 1. For example, the fastening block 23 is fastened by screws 231. The cross-section of the fastening block 23 is T-shaped, which is larger on the outside and smaller on the inside. The fastening of the fastening block 23 to the sliding stripe 21 ensures that the two can move up and down synchronously and cannot be detached from the base 1. A wrench element 24 is pivotally connected to the exposed structure of the fastening block 23. A buckle ring 25 is coupled to the wrench element 24. The buckle ring 25 has a square ring shape. When the buckle ring 25 is fastened, the buckle ring 25 is hooked to the one hook block 14 or two hook blocks 14 disposed at same height. As shown in FIGS. 2-4, the buckle ring 25 may encircle one or more hook blocks to securely lock the sliding strip 21 and the clamping element 2 in a position.

Figure 5:
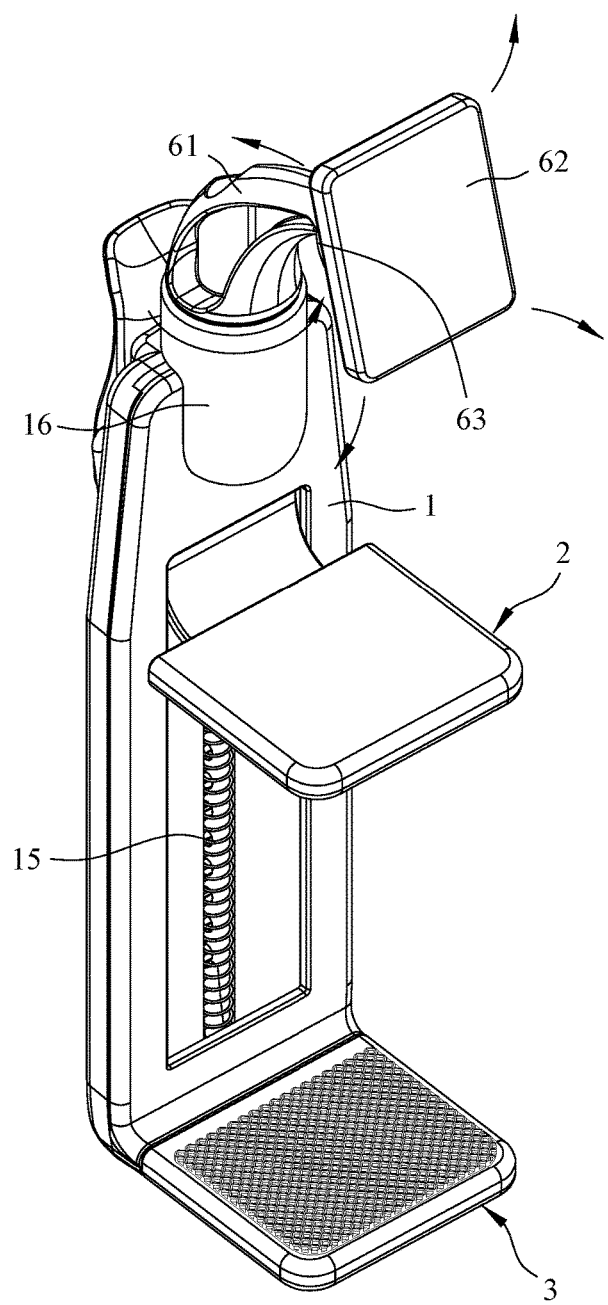
FIG. 5 shows a schematic view of the first embodiment of the present invention in actual application.

As shown in FIG. 4 and FIG. 5, a spring 15 may be further disposed in the base 1, the two ends of the spring 15 are respectively fixed to the clamping element 2 and the counteracting member 3, so that the clamping element 2 can be as close as possible to the counteracting element 3 without the presence of an external force to allow the user to easily pull the clamping element 2 initially and then let the restoration force of the spring 15 to bring the clamping element 2 and the counteracting 3 slightly clamping onto the board for subsequent locking action.

Figure 6A:
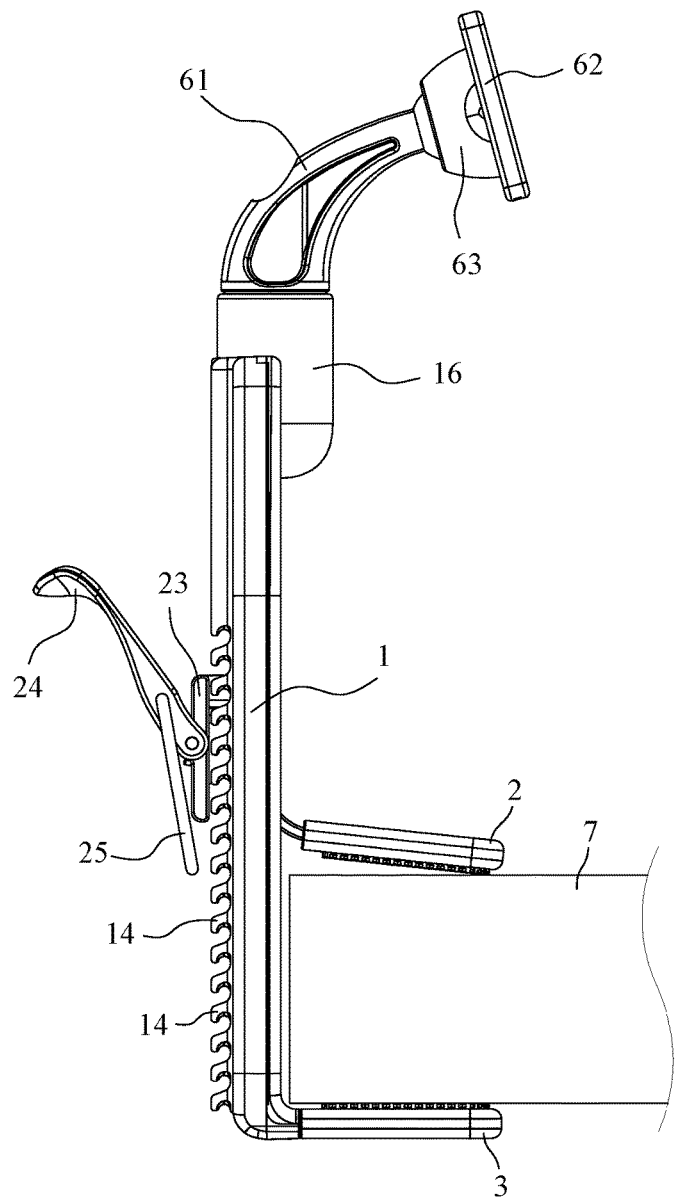
FIG. 6A shows a schematic view of the first embodiment of the present invention before clamping onto a board.

The base 1 further comprises a connection unit 16 for connecting a supporting arm or supporting rod. FIG. 5 shows an actual application embodiment. In the present embodiment, the present invention is used to hold a portable electronic product. The connection unit 16 is coupled to a rotatable support arm 61. A magnet seat 62 is disposed on the top of the support arm 61. The magnet seat 62 uses a spherical coupling structure 63 to connect with the supporting arm 61 (as shown in FIG. 6A). The purpose of the spherical coupling structure 63 is to allow the magnetic seat 62 to be adjustable for different angles. The magnetic seat 62 is to use an internal magnet to attract the portable electronic product. The portable electronic product may be a tablet PC, a cell phone, and so on. However, if the present invention is used to fasten a lamp, such as a desk lamp, the connection unit 16 is a supporting bar for connecting and fastening the lamp. Therefore, the shape and structure of the connection unit 16 are not restricted. In addition, in the present embodiment, the connection unit 16 and the counteracting element 3 are respectively fixed on two sides of the base 1 along the length of the rectangular parallelepiped body. However, the present invention is not limited thereto. The connection unit 16 and the counteracting element 3 can also be fixed to the same side of the base 1.

Figure 6B:
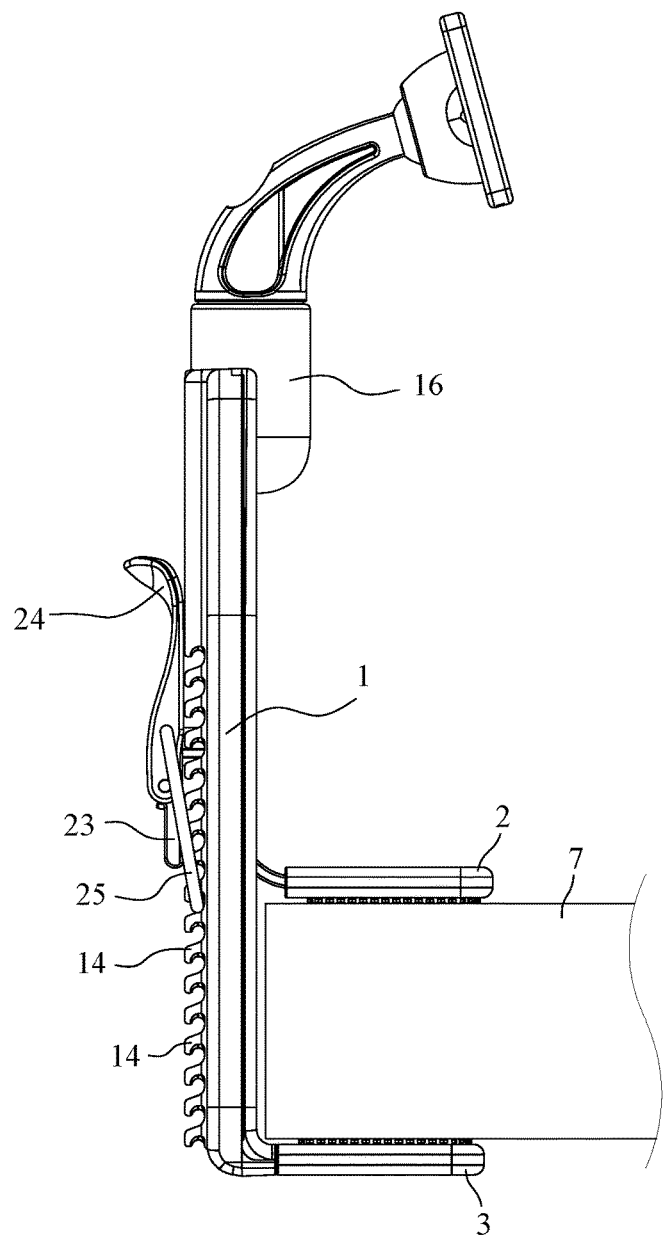
FIG. 6B shows a side view of the first embodiment of the present invention clamping onto a board.

The following describes the actual operation of the present invention. As shown in FIG. 6A, the locking structure at the back of the base 1 is temporarily released, and the user moves the clamping element 2 by an external force to clamp the clamping element 2 and the counteracting element 3 to a board 7. When the external force disappears, the clamping element 2 and the counteracting element 3 remain temporarily clamping on the board because of the spring 15. In this case, the clamping element 2 is in an inclining position. Afterwards, the user pulls the wrench element 24 downward to fasten the buckle ring 25 to the corresponding hook block 14. As shown in FIG. 6B, the user pulls the wrench element 24 upwards, causing the fastening block 23 to descend, so that the clamping element 2 is deformed to be in a horizontal position from the original inclining position, to achieve clamping onto the board 7. The board 7 may be a tabletop, a platform, a screen partition, etc., or various products having a plate-like structure.

Figure 7:
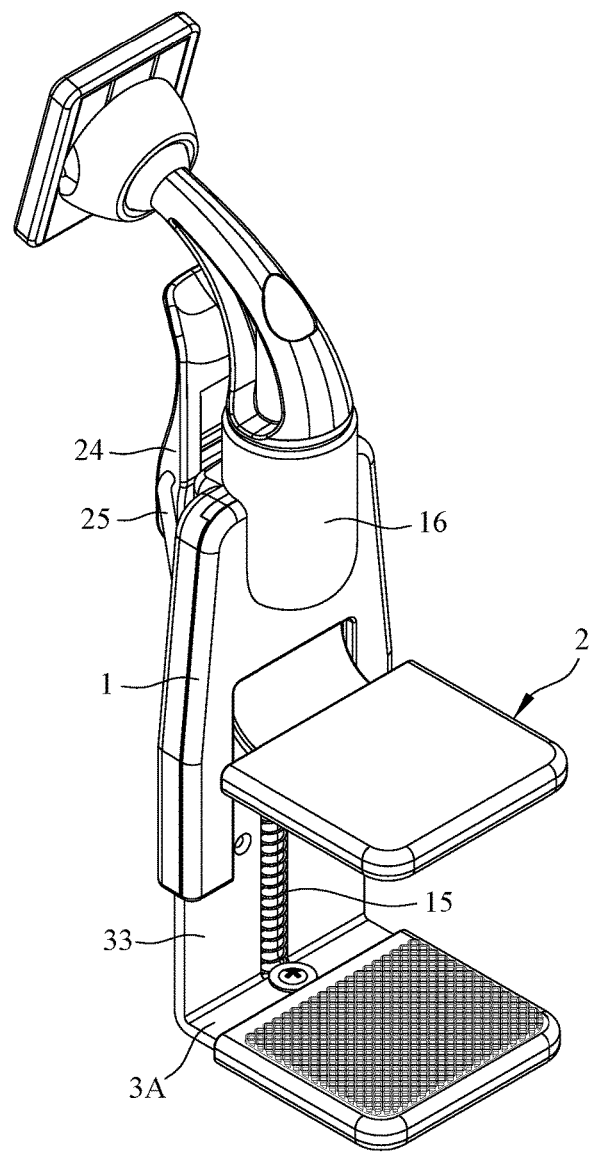
FIG. 7 shows a schematic view of the second embodiment of the present invention.
Figure 8:
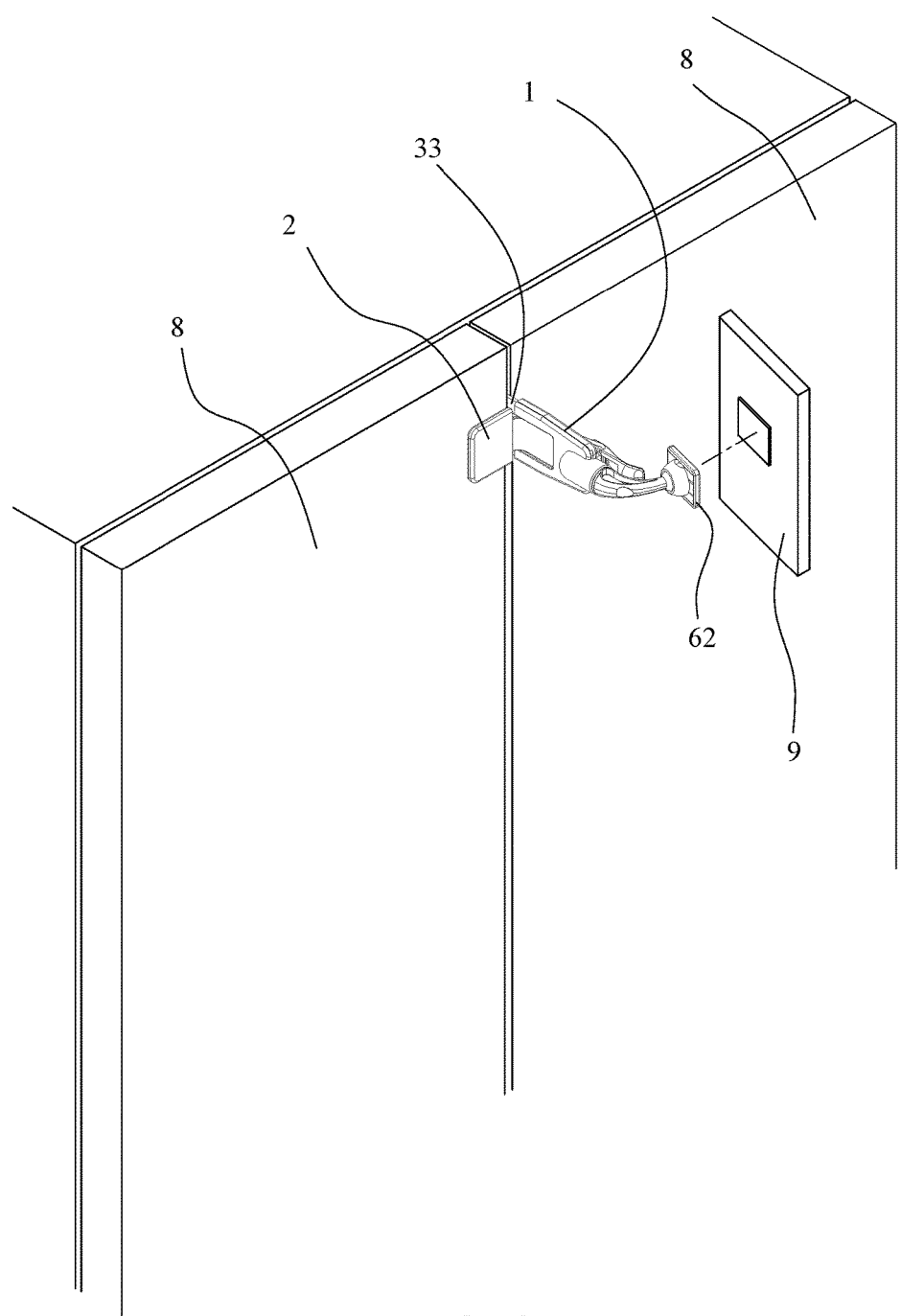
FIG. 8 shows a schematic view of the second embodiment of the present invention in actual application.

FIG. 7 shows a schematic view of a second embodiment of the present invention. In the present embodiment, the present invention is to clamp onto the kitchen cupboard door. The main difference is that the counteracting element 3A is designed as an L-shaped metal sheet. After the counteracting element 3 is fixed to the base 1, the assembly of the two has still an L-shaped profile. The counteracting element retains a vertical exposed connection section 33, which is thinner than the base 1. FIG. 8 shows the actual use of this embodiment. Since only a small gap space is left between two cupboard doors 8 when closed, the design of the second embodiment must use the connection section 33 to stay in the gap between the two cupboard doors 8 and then clamp the clamping element 2 and the counteracting element 3 onto the single door 8. As such, the present invention can be fixed on the kitchen cupboard door for a cell phone 9 to be attracted to the magnetic seat 62 to allow use of the cell phone 9. The second embodiment of the present invention can therefore be used in places or plates that only have small gap space.

In summary, the clamping base for holder of the present invention provides a convenient clamping, secured locking, and fast releasing design, allowing the user to easily clamp onto the various boards, to provide anchor for supporting arm or supporting rod to hold portable electronic device.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A clamping base for a holder, comprising:
    a base having a sliding track, an opening and a guiding groove respectively formed on two opposite sides of said sliding track in parallel;
    a clamping element having an extended sliding strip installed inside said sliding track;
    a plurality of hook blocks disposed at equal intervals on an outer wall of said base surrounding said guiding groove;
    a fastening block having an extended portion fit in said guiding groove and fastened to said extended sliding strip with said fastening block being blocked by said plurality of hook blocks on one side of said base and said clamping element being positioned on the other side of said base;
    a wrench element coupled with said fastening block, said wrench element having a buckle ring coupled thereon for engaging and encircling one or more of said plurality of hook blocks to lock said extended sliding strip and said clamping element at a position; and
    a counteracting element fixed to said base on the same side as said clamping element to form an L-shaped assembly; wherein said clamping element is moveable towards or away from said counteracting element by sliding said extended sliding strip along said sliding track.

2. The clamping base for a holder as claimed in claim 1, wherein said clamping element is a metal plate having an extended portion bent into said extended sliding strip to form a substantially L-shaped assembly so that said clamping element has flexibility and deformation for being slightly bent to enhance clamping tightness.

3. The clamping base for a holder as claimed in claim 1, wherein a portion of said plurality of hook blocks is divided into two rows with each row being disposed on one side of said guiding groove so that two hook blocks are disposed at a same height on the two sides of said guiding groove.

4. The clamping base for a holder as claimed in claim 3, wherein said buckle ring has a substantially square shape so as to engage with one or two hook blocks at the same height.

5. The clamping base for a holder as claimed in claim 1, wherein said clamping element is sheathed inside a soft protective cover.

6. The clamping base for a holder as claimed in claim 1, wherein said counteracting element is sheathed inside a soft protective cover.

7. The clamping base for a holder as claimed in claim 1, wherein said counteracting element is an L-shaped metal plate with one portion fixed inside said base and a connection segment exposed out of said base, said connection segment having thickness less than said base.

8. The clamping base for a holder as claimed in claim 1, wherein said base comprises a connection unit for facilitating installation to a supporting arm to hold a portable device.

9. The clamping base for a holder as claimed in claim 8, wherein said connection unit and said counteracting element are fixed to two opposite sides of said base.

* * * * *